(12) United States Patent
Yamazaki et al.

(10) Patent No.: US 12,172,312 B2
(45) Date of Patent: Dec. 24, 2024

(54) METHOD OF GENERATING CONTROL PROGRAM FOR ROBOT, STORAGE MEDIUM, AND TEACHING APPARATUS

(71) Applicant: SEIKO EPSON CORPORATION, Tokyo (JP)

(72) Inventors: Takema Yamazaki, Fujimi-machi (JP); Daisuke Sato, Matsumoto (JP); Daiki Tokushima, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 260 days.

(21) Appl. No.: 17/702,822

(22) Filed: Mar. 24, 2022

(65) Prior Publication Data

US 2022/0331954 A1     Oct. 20, 2022

(30) Foreign Application Priority Data

Mar. 25, 2021   (JP) .................................. 2021-051241

(51) Int. Cl.
*B25J 9/16*            (2006.01)

(52) U.S. Cl.
CPC .................................... *B25J 9/163* (2013.01)

(58) Field of Classification Search
CPC ....................................................... B25J 9/163
See application file for complete search history.

(56) References Cited

U.S. PATENT DOCUMENTS

| | | | | |
|---|---|---|---|---|
| 2002/0161477 A1* | 10/2002 | Doi | ..................... | G05B 19/4067 |
| | | | | 700/264 |
| 2007/0021868 A1* | 1/2007 | Nagatsuka | ............. | B25J 9/1674 |
| | | | | 700/245 |
| 2010/0305751 A1* | 12/2010 | Nagatsuka | ............ | G06F 30/367 |
| | | | | 700/245 |
| 2014/0257558 A1* | 9/2014 | Frische | .................. | B25J 9/1664 |
| | | | | 700/245 |
| 2015/0134111 A1* | 5/2015 | Nakajima | ............... | B25J 9/1664 |
| | | | | 901/9 |
| 2015/0239121 A1* | 8/2015 | Takeda | ..................... | G06N 7/00 |
| | | | | 700/250 |
| 2016/0008976 A1 | 1/2016 | Nagatsuka et al. | | |
| 2016/0129596 A1* | 5/2016 | Pfaff | ..................... | B25J 9/1682 |
| | | | | 700/255 |

(Continued)

FOREIGN PATENT DOCUMENTS

JP        H11134012 A     5/1999
JP        H11345018 A    12/1999

(Continued)

*Primary Examiner* — Jaime Figueroa
*Assistant Examiner* — Mohamad O El Sayah
(74) *Attorney, Agent, or Firm* — Samson G. Yu

(57) ABSTRACT

A method of generating a control program for a robot includes generating a trajectory in which a robot arm moves between a plurality of teaching points based on a first constraint condition with respect to a movement time of the robot arm and a second constraint condition with respect to a drive condition for driving the robot arm by a processor, displaying the trajectory generated by the processor and accumulated power consumption when the robot arm moves along the trajectory by a display unit, and, when receiving an instruction to employ the trajectory, generating a control program for the robot based on the trajectory by the processor.

7 Claims, 9 Drawing Sheets

(56) References Cited

U.S. PATENT DOCUMENTS

| | | | | |
|---|---|---|---|---|
| 2017/0225331 A1* | 8/2017 | Sussman | ............... | B25J 9/1676 |
| 2018/0079416 A1* | 3/2018 | Damman | ............... | B60W 10/26 |
| 2018/0236657 A1* | 8/2018 | Kuwahara | ............. | B25J 9/1671 |
| 2019/0240833 A1* | 8/2019 | Kimura | ................. | B25J 9/1664 |
| 2020/0047339 A1 | 2/2020 | Sawada et al. | | |
| 2020/0130200 A1* | 4/2020 | Adachi | ................. | B25J 13/085 |
| 2021/0170603 A1* | 6/2021 | Kotlarski | ............... | B25J 13/006 |

FOREIGN PATENT DOCUMENTS

| | | | |
|---|---|---|---|
| JP | 2011062766 A | 3/2011 | |
| JP | 2013063475 A | 4/2013 | |
| JP | 2016016488 A | 2/2016 | |
| JP | 2016215316 A | 12/2016 | |
| JP | 2017064802 A | 4/2017 | |
| WO | 2018194094 A1 | 10/2018 | |

* cited by examiner

METHOD OF GENERATING CONTROL PROGRAM FOR ROBOT, STORAGE MEDIUM, AND TEACHING APPARATUS

The present application is based on, and claims priority from JP Application Serial Number 2021-051241, filed Mar. 25, 2021, the disclosure of which is hereby incorporated by reference herein in its entirety.

BACKGROUND

1. Technical Field

The present disclosure relates to a method of generating a control program for a robot, a storage medium, and a teaching apparatus.

2. Related Art

In related art, as shown in JP-A-2013-63475, a power consumption monitoring apparatus for industrial robot operating according to a work program is known. The power consumption monitoring apparatus disclosed in JP-A-2013-63475 detects power supplied to a servo motor driving a manipulator in a power detection unit and reports accumulated power consumption of the industrial robot to a worker with respect to each step of the work program. The worker may suppress and save the accumulated power consumption by correcting the work program while keeping balance between takt time and power consumption.

However, in the power consumption monitoring apparatus disclosed in JP-A-2013-63475, there is a problem that prior optimization of the trajectory of the manipulator to reduce the power consumption required for driving of the industrial robot is hard because the accumulated power consumption of the industrial robot is not known in advance.

SUMMARY

A method of generating a control program for a robot includes (a) receiving an instruction on a plurality of teaching points as a reference for movement of a robot arm of a robot by a control unit, (b) generating a trajectory in which the robot arm moves between the plurality of teaching points based on a first constraint condition with respect to a movement time for which the robot arm moves between the plurality of teaching points and a second constraint condition with respect to a drive condition for driving the robot arm to move between the plurality of teaching points by the control unit, (c) displaying the trajectory and accumulated power consumption when the robot arm moves between the plurality of teaching points along the trajectory by a display unit, and (d) when receiving an instruction to employ the trajectory by the control unit, generating a control program for the robot based on the trajectory by the control unit.

A non-transitory computer-readable storage medium stores a computer program for controlling a processor to execute processing of generating a control program for a robot, the computer program controlling the processor to execute (a) processing of receiving an instruction on a plurality of teaching points as a reference for movement of a robot arm, (b) processing of generating a trajectory in which the robot arm moves between the plurality of teaching points based on a first constraint condition with respect to a movement time for which the robot arm moves between the plurality of teaching points and a second constraint condition with respect to a drive condition for driving the robot arm to move between the plurality of teaching points, (c) processing of displaying the trajectory and accumulated power consumption when the robot arm moves between the plurality of teaching points along the trajectory on a display unit, and (d) when receiving an instruction to employ the trajectory, processing of generating a control program for the robot based on the trajectory.

A teaching apparatus includes a processor, and a display unit, and the processor executes (a) processing of receiving an instruction on a plurality of teaching points as a reference for movement of a robot arm, (b) processing of generating a trajectory in which the robot arm moves between the plurality of teaching points based on a first constraint condition with respect to a movement time for which the robot arm moves between the plurality of teaching points and a second constraint condition with respect to a drive condition for driving the robot arm to move between the plurality of teaching points, (c) processing of displaying the trajectory and accumulated power consumption when the robot arm moves between the plurality of teaching points along the trajectory on the display unit, and (d) when receiving an instruction to employ the trajectory, processing of generating a control program for the robot based on the trajectory.

DESCRIPTION OF EXEMPLARY EMBODIMENTS

1. Embodiment 1

Figure 1:
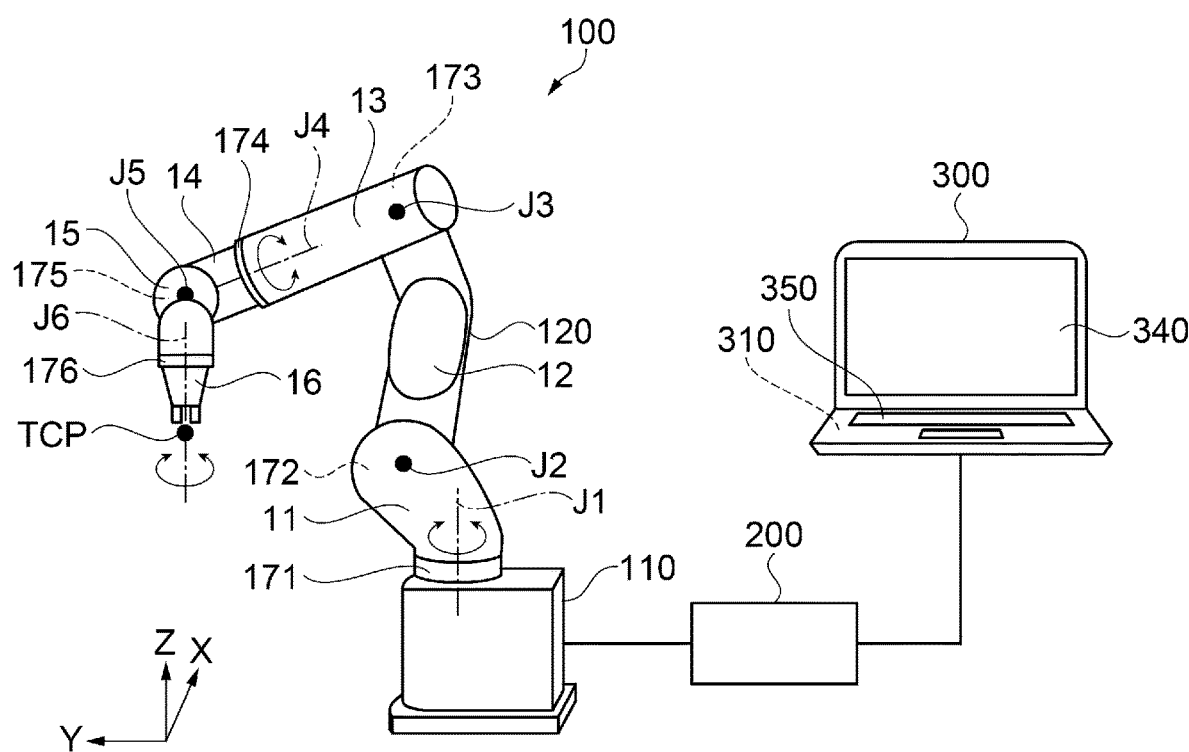
FIG. 1 is an explanatory diagram of a robot system according to Embodiment 1.

A robot system according to Embodiment 1 will be explained with reference to FIGS. 1 and 2. In FIG. 1, an X-axis, a Y-axis, and a Z-axis as three axes defining an orthogonal coordinate system in a three-dimensional space are shown. The orthogonal coordinate system is a robot coordinate system having the origin at a preset reference point for a robot 100. The X-axis and the Y-axis are axes in horizontal directions and the Z-axis is an axis in vertical directions. The vertical direction in the present disclosure refers to the direction of gravitational force.

As shown in FIG. 1, the robot system includes the robot 100, a control apparatus 200 that controls the robot 100, and a teaching apparatus 300 that generates a control program for controlling the robot 100. The robot 100, the control apparatus 200, and the teaching apparatus 300 can communicate with one another via wired or wireless connection. In the embodiment, the control apparatus 200 is separately provided from the robot 100, however, may be provided inside of the robot 100.

The robot 100 includes a base 110 and a robot arm 120 coupled to the base 110. The robot arm 120 has a first arm 11, a second arm 12, a third arm 13, a fourth arm 14, a fifth arm 15, and a sixth arm 16. The first arm 11, the second arm 12, the third arm 13, the fourth arm 14, the fifth arm 15, and the sixth arm 16 are sequentially coupled from the proximal end side of the robot arm 120 at which the robot arm 120 is coupled to the base 110 toward the distal end side of the robot arm 120.

The base 110 and the first arm 11 are coupled via a joint 171. The first arm 11 is pivotable around a first pivot axis J1 as a pivot center relative to the base 110. The first arm 11 pivots around the first pivot axis J1 as the pivot center by driving of a motor (not shown). The first arm 11 and the motor (not shown) are coupled via a reducer (not shown).

The first arm 11 and the second arm 12 are coupled via a joint 172. The second arm 12 is pivotable around a second pivot axis J2 as a pivot center relative to the first arm 11. The second arm 12 pivots around the second pivot axis J2 as the pivot center by driving of a motor (not shown). The second arm 12 and the motor (not shown) are coupled via a reducer (not shown).

Similarly, the second arm 12 and the third arm 13 are coupled via a joint 173, the third arm 13 and the fourth arm 14 are coupled via a joint 174, the fourth arm 14 and the fifth arm 15 are coupled via a joint 175, and the fifth arm 15 and the sixth arm 16 are coupled via a joint 176. The second arm 12, the third arm 13, the fourth arm 14, the fifth arm 15, and the sixth arm 16 pivot around a third pivot axis J3, a fourth pivot axis J4, a fifth pivot axis J5, and a sixth pivot axis J6 as pivot centers by driving of motors (not shown), respectively. The arms 12 to 16 and the motors respectively driving the arms 12 to 16 are respectively coupled via reducers (not shown).

As the motors (not shown) respectively driving the arms 11 to 16, e.g. AC servo motors, DC servo motors, or the like may be used. As the reducers (not shown) coupled to the respective motors, planetary gear reducers including a plurality of gears, wave reducers, or the like may be used.

A TCP (Tool Center Point) is set near the distal end portion of the robot arm 120 as a control point for the robot arm 120. The control point is a point as a reference for control of the robot arm 120. The TCP can be set in an arbitrary position.

The control of the robot 100 in the present disclosure refers to control of a position and an attitude of the TCP as the control point for the robot arm 120. That is, the control of the robot 100 in the present disclosure includes control of the robot arm 120, and the control program for the robot 100 for controlling the robot 100 includes a control program for controlling the robot arm 120.

The control apparatus 200 has a function of controlling the robot 100. The control apparatus 200 is electrically coupled to the respective parts of the robot 100. The control apparatus 200 includes a motor driver (not shown) and controls the motors (not shown) respectively driving the arms 11 to 16 via the motor driver, and thereby, controls motion of the robot arm 120.

The teaching apparatus 300 has a function of executing teaching processing for the robot 100 and generating the control program for the robot 100. The teaching apparatus 300 is electrically coupled to the control apparatus 200. The teaching apparatus 300 includes a display unit 340, an operation unit 350, and a processor 310 corresponding to "control unit" according to the present disclosure. The teaching apparatus 300 is an information processing apparatus e.g. a personal computer, a tablet terminal, a smartphone, or the like. Note that, as the teaching apparatus 300, a teaching pendant (not shown) electrically coupled to the control apparatus 200 may be used.

Figure 2:
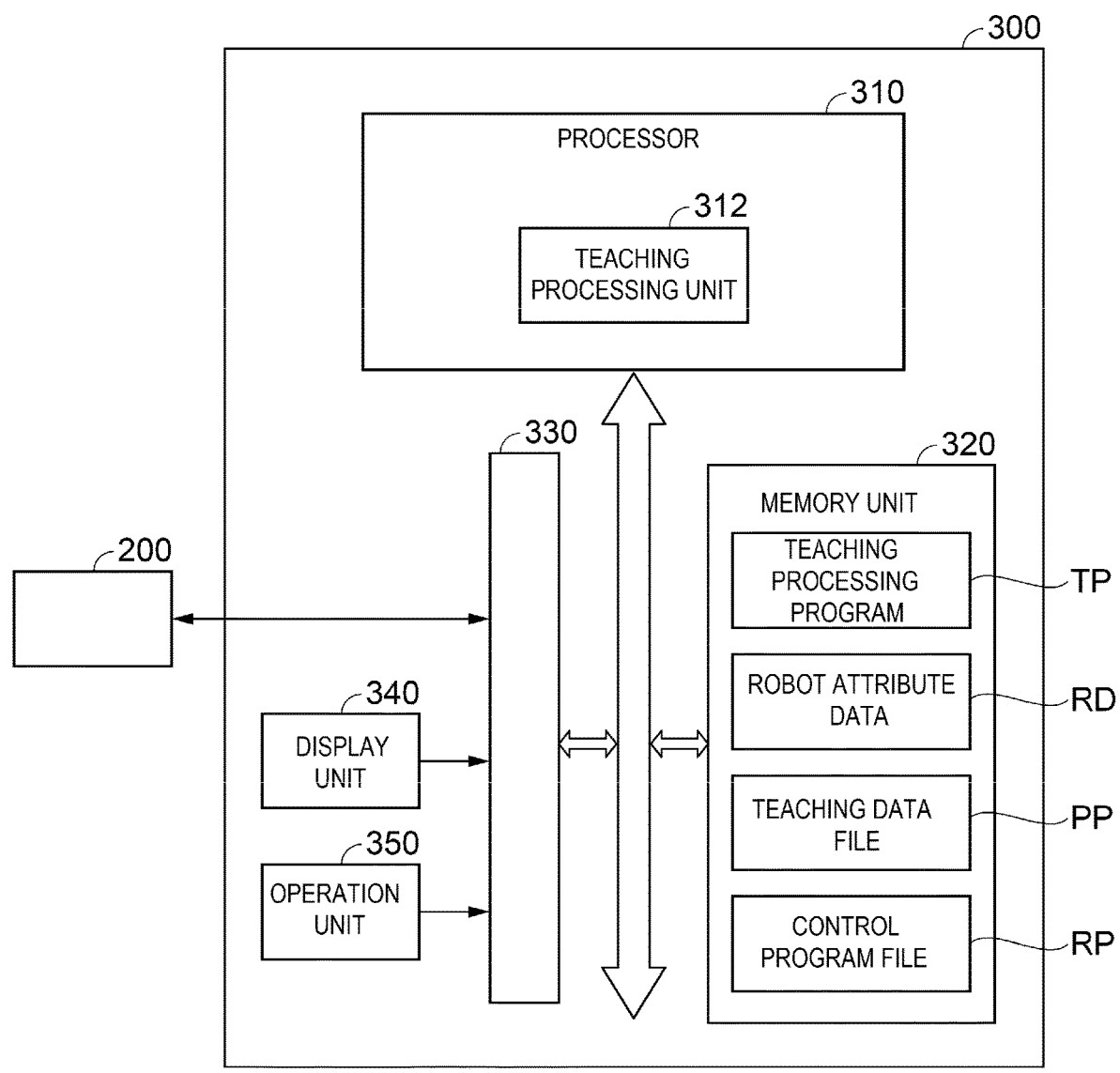
FIG. 2 is a functional block diagram of a teaching apparatus according to Embodiment 1.

As shown in FIG. 2, the teaching apparatus 300 includes the processor 310, a memory unit 320, an interface circuit 330, and the display unit 340 and the operation unit 350 coupled to the interface circuit 330. The control apparatus 200 is further coupled to the interface circuit 330.

The processor 310 reads out a program, data, etc. stored in the memory unit 320 and executes the program read out from the memory unit 320. The processor 310 reads out and executes a teaching processing program TP stored in the memory unit 320, and thereby, the processor 310 functions as a teaching processing unit 312 executing teaching processing of the robot 100. The teaching processing unit 312 creates the control program for the robot 100 based on the teaching processing program TP using the display unit 340 and the operation unit 350. In other words, the method of generating the control program for the robot 100 is realized by the processor 310 executing the teaching processing program TP stored in the memory unit 320.

As the processor 310, e.g. an integrated circuit such as a CPU (Central Processing Unit) or an MPU (Micro Processing Unit) may be used.

In the memory unit 320, robot attribute data RD, a teaching data file PP, and a control program file RP are stored in addition to the teaching processing program TP. The robot attribute data RD contains a configuration of the robot arm 120. The configuration of the robot arm 120 includes specifications of the motors for driving the robot arm 120 and the reducers etc. The teaching data file PP is a file in which information on teaching points used in the control program for the robot 100 and a first constraint condition and a second constraint condition, which will be described later, are stored. The control program for the robot 100 includes a plurality of commands to move the robot 100. The control program file RP is a file in which a plurality of the control programs for the robot 100 may be stored.

As the memory unit 320, e.g. a volatile memory such as a RAM (Random Access Memory), a nonvolatile memory such as a ROM (Read Only Memory), a detachable external memory device, or the like may be used.

The display unit 340 displays various windows e.g. a window receiving an input operation and a select operation by a teacher, a window showing the control program for the robot 100, etc. under control by the teaching processing unit 312.

The operation unit 350 transmits an operation signal to the teaching processing unit 312 based on an input operation, a select operation, a window transition operation, or the like by the teacher. The teaching processing unit 312 changes the details of display on the display unit 340 based on the operation signal from the operation unit 350.

As the display unit 340, e.g. a liquid crystal display may be used. As the operation unit 350, e.g. a mouse, a keyboard, a touch panel, or the like may be used. Note that the display unit 340 and the operation unit 350 may be integrally formed like a touch-panel display.

Next, a method of generating the control program for the robot 100 will be explained with reference to FIGS. 3 to 8.

Figure 3:
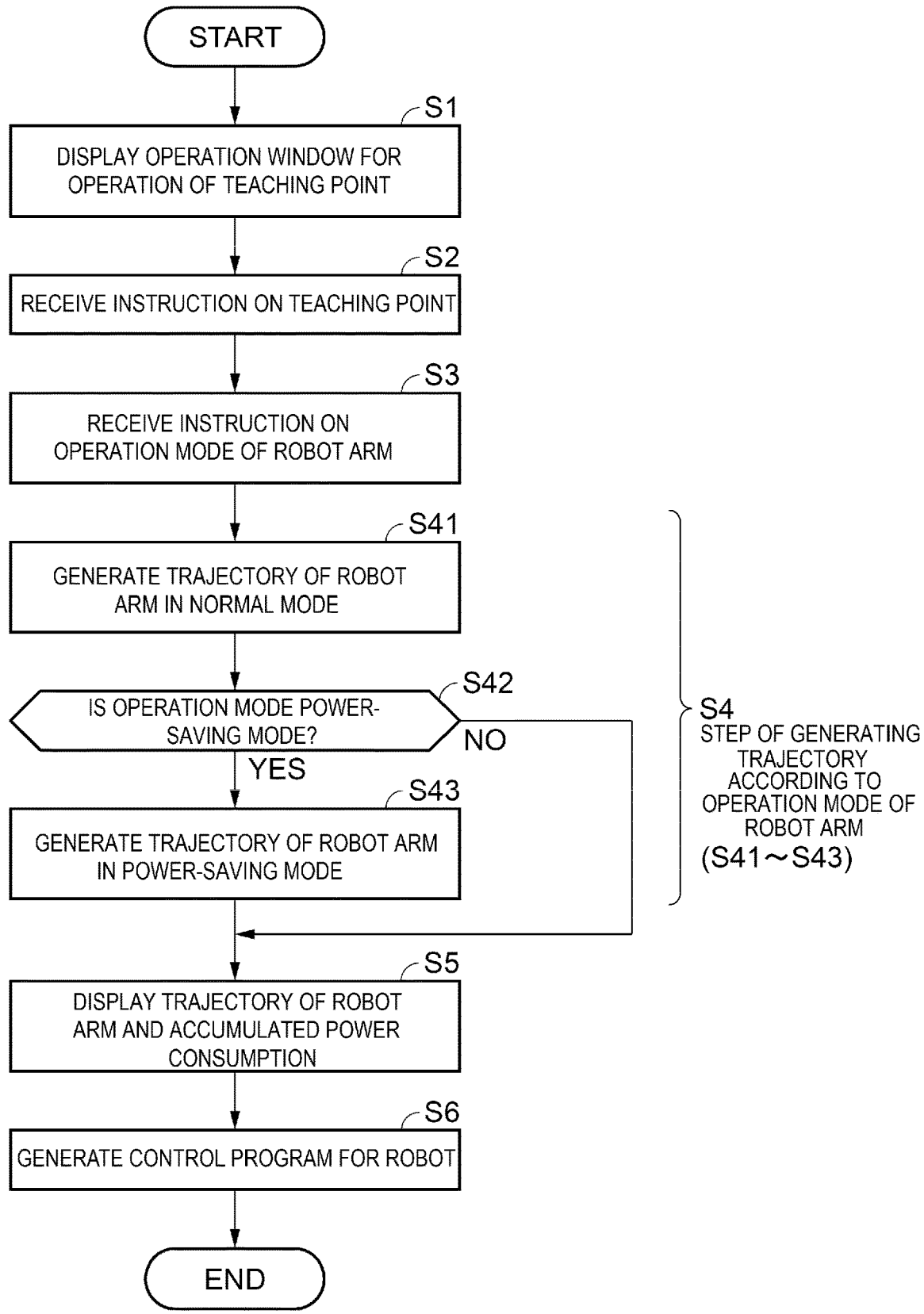
FIG. 3 is a flowchart showing a method of creating a control program for a robot according to Embodiment 1.

As shown in FIG. 3, the method of generating the control program for the robot 100 includes a step of displaying an operation window for receiving an instruction on teaching data of the teaching point or the like, a step of receiving an instruction on the teaching point, a step of receiving an instruction on an operation mode of the robot arm 120, a step of generating a trajectory of the robot arm 120 according to the operation mode of the robot arm 120, a step of displaying the trajectory of the robot arm 120 and accumulated power consumption of the robot arm 120, and a step of generating the control program for the robot 100. In the embodiment, the trajectory of the robot arm 120 is generated by PTP control (Point to Point control).

Note that "trajectory" in the present disclosure is a concept defined according to the Japanese Industrial Standard B 0134:2015. Specifically, "trajectory" in the present disclosure is a concept formed by addition of time as a parameter to a route as an ordered set of combinations of positions and attitudes of the robot arm 120.

Step S1 is the step of displaying the operation window for receiving the instruction on teaching data of the teaching point or the like.

The teacher starts the teaching processing program TP, and thereby, an operation window W10 is displayed on the display unit 340 at step S1.

Figure 4:
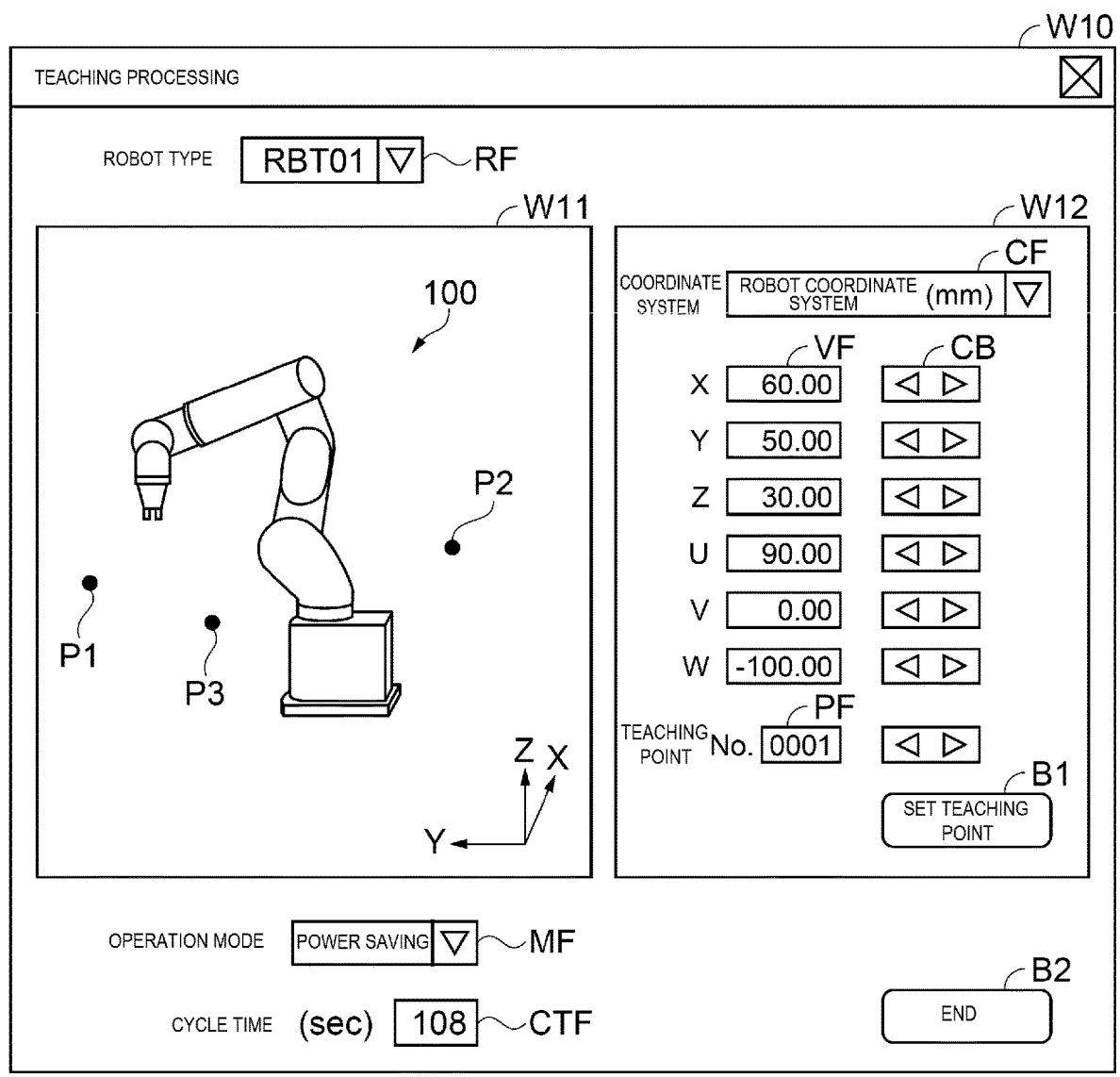
FIG. 4 is an explanatory diagram showing an example of an operation window for receiving instructions on teaching data according to Embodiment 1.

As shown in FIG. 4, the operation window W10 contains a robot display window W11 for display of a robot select field RF for selection of a robot type and a simulation image of the robot 100, a jog operation window W12 for instruction on a teaching point by a jog operation, an operation mode select field MF for selection of the operation mode of the robot arm 120, a cycle time set field CTF for setting a target value with respect to a movement time of the robot arm 120, and an end button B2. Note that the movement time of the robot arm 120 in the present disclosure refers to a time for which the robot arm 120 moves from a motion start point to a motion end point. Further, in the embodiment, the movement time of the robot arm 120 is also referred to as "cycle time" of the robot arm 120.

Step S2 is the step of receiving the instruction on the teaching point.

The teacher may give the instruction on the teaching point by operating the jog operation window W12. The teaching point refers to a virtual point as a target at which the position and the attitude of the TCP as the control point of the robot arm 120 coincide in the control program for the robot 100. That is, the teaching point refers to a point as a reference for the movement of the robot arm 120. The teacher gives an instruction on a plurality of teaching points including a teaching point as the motion start point of the robot arm 120 and a teaching point as the motion end point of the robot arm 120, and thereby, may teach a plurality of points as a reference of a trajectory in which the robot arm 120 moves between the motion start point and the motion end point to the robot 100.

The jog operation window W12 contains a coordinate system select field CF for selection of a coordinate system, coordinate value fields VF for designation of six coordinate values according to the selected coordinate system, a teaching point field PF for designation of a teaching point to be edited, and a teaching point set button B1. Increase and decrease buttons CB for increasing and decreasing values are placed on the right sides of the individual coordinate value fields VF and the right side of the teaching point field PF. The coordinate system select field CF is a field for selection of arbitrary one of a robot coordinate system, a tool coordinate system, and a joint coordinate system. In the embodiment, the coordinate system select field CF is formed as a pull-down menu.

The teacher sets the value in the teaching point field PF, and thereby, may select a teaching point as an object for an instruction by the teacher. Further, the teacher may set coordinate values of the teaching point by a jog operation in the jog operation window W12. Then, the teacher presses the teaching point set button B1, and thereby, the instruction on the teaching point is received by the teaching processing unit 312 and the teaching point is set and stored. Specifically, the teacher presses the teaching point set button B1, and thereby, the coordinate values of the teaching point indicating the position and the attitude of the TCP are stored in the teaching data file PP stored in the memory unit 320.

Further, in the robot display window W11, a simulation image containing a three-dimensional image of the robot 100 with the position and attitude of the robot arm 120 changed by the jog operation by the teacher and the position of the teaching point set by the teacher is displayed. In the embodiment, an instruction on three teaching points of a first teaching point P1, a second teaching point P2, and a third teaching point P3 is given by the teacher, and the teaching points P1 to P3 are displayed in the robot display window W11.

Note that, in the embodiment, the teaching processing is performed by the teacher so that the robot arm 120 may move from the first teaching point P1 as the motion start point to the second teaching point P2, further move from the second teaching point P2 to the third teaching point P3, and move from the third teaching point P3 to the first teaching point P1 as the motion end point. Thereby, in the embodiment, a trajectory in which the robot arm 120 moves between the plurality of teaching points P1 to P3 including the motion start point and the motion end point is a trajectory formed by sequential coupling of a partial trajectory of the movement from the first teaching point P1 to the second teaching point P2, a partial trajectory of the movement from the second teaching point P2 to the third teaching point P3, and a partial trajectory of the movement from the third teaching point P3 to the first teaching point P1.

Step S3 is the step of receiving the instruction on the operation mode of the robot arm 120. The operation mode of the robot arm 120 refers to information for designation of a state of the robot arm 120 when the robot arm 120 is moved. The operation mode is changed, and thereby, an algorithm or a parameter for controlling the position and the attitude of the robot arm 120 is changed or a control target value including a speed of the robot arm 120 is changed.

In the embodiment, the robot arm 120 has two operation modes of a normal mode and a power-saving mode. The power-saving mode is a mode in which the robot arm 120 is moved to suppress the accumulated power consumption when the robot arm 120 moves between the plurality of teaching points P1 to P3 including the motion start point of the robot arm 120 and the motion end point of the robot arm 120. In other words, the power-saving mode is a mode to optimize the trajectory of the robot arm 120 using the accumulated power consumption of the robot arm 120 as a main evaluation criterion for the trajectory when the trajectory of the robot arm 120 is generated.

The normal mode is the other operation mode than the power-saving mode. The normal mode is a mode in which the robot 100 is moved by e.g. minimum time control to minimize the movement time when the robot arm 120 moves between the plurality of teaching points P1 to P3, high-accuracy control to increase the accuracy of the position and the attitude of the TCP when the robot arm 120 is moved, or the like. In other words, the normal mode is a mode to optimize the trajectory of the robot arm 120 using, not the accumulated power consumption of the robot arm 120, but e.g. the movement time of the robot arm 120, the accuracy of the position and the attitude of the TCP, or the like as the main evaluation criterion for the trajectory when the trajectory of the robot arm 120 is generated.

The teacher selects one of the normal mode and the power-saving mode as the operation mode of the robot arm 120 in the operation mode select field MF for selection of the operation mode of the robot arm 120. In the embodiment, the operation mode select field MF is formed as a pull-down menu. Note that, as the normal mode, e.g. a plurality of other operation modes including minimum time control and high-accuracy control than the power-saving mode may be selected.

The teacher selects the operation mode in the operation mode select field MF, and thereby, the instruction on the operation mode of the robot arm 120 is received by the teaching processing unit 312. The details of the instruction on the operation mode are stored in the teaching data file PP stored in the memory unit 320.

Further, the teacher sets a target value with respect to the movement time when the robot arm 120 moves between the plurality of teaching points P1 to P3 in the power-saving mode in the cycle time set field CTF. The target value with respect to the movement time of the robot arm 120 in the power-saving mode corresponds to the first constraint condition in the present disclosure. In the embodiment, the target value with respect to the movement time of the robot arm 120 in the power-saving mode is the maximum value Tmax of the movement time of the robot arm 120. Note that, when selecting the power-saving mode in the operation mode select field MF, the teacher may set a target value with respect to the movement time of the robot arm 120 in the power-saving mode in the cycle time set field CTF.

The teacher sets the target value with respect to the movement time of the robot arm 120 in the power-saving mode in the cycle time set field CTF, and thereby, an instruction on the target value with respect to the movement time of the robot arm 120 in the power-saving mode as the first constraint condition is received by the teaching processing unit 312. The target value with respect to the movement time of the robot arm 120 in the power-saving mode is stored in the teaching data file PP stored in the memory unit 320.

The teacher presses the end button B2 in the operation window W10 taught on the display unit 340, and the process goes to step S4.

In the embodiment, step S4 is the step of generating the trajectory of the robot arm 120 according to the operation mode of the robot arm 120. Step S4 as the step of generating the trajectory of the robot arm 120 according to the operation mode of the robot arm 120 includes step S41 of generating a trajectory of the robot arm 120 in the normal mode, step S42 of determining whether or not the operation mode is the power-saving mode, and step S43 of generating a trajectory of the robot arm 120 in the power-saving mode.

Step S41 is a step of generating a trajectory of the robot arm 120 in the normal mode.

The teaching processing unit 312 generates the trajectory when the robot arm 120 moves between these plurality of teaching points P1 to P3 based on the coordinate values of the plurality of teaching points P1 to P3 registered in the teaching data file PP. As the method of generating the trajectory, various known methods may be employed. For example, RRT (Rapidly exploring random tree), PRM (Probabilistic roadmap method), or the like may be employed, however, any method may be applied.

Trajectory data of the trajectory of the robot arm 120 in the normal mode generated at step S41 is stored in the teaching data file PP stored in the memory unit 320.

Further, in the embodiment, the accumulated power consumption when the robot arm 120 moves along the trajectory of the robot arm 120 in the normal mode is calculated. The calculated accumulated power consumption of the robot arm 120 in the normal mode is stored in the teaching data file PP stored in the memory unit 320. Note that the information stored in the teaching data file PP may include instantaneous maximum power consumption, average power consumption, the movement time, or the like of the robot arm 120 in the normal mode in addition to the accumulated power consumption of the robot arm 120 in the normal mode.

Note that, in the embodiment, the accumulated power consumption of the robot arm 120 is calculated first by calculation of the power consumption of the robot arm 120 when the robot arm 120 moves along the respective partial trajectories forming the trajectory with respect to each partial trajectory, and then, by summation of the power consumption of the robot arm 120 calculated with respect to each partial trajectory. Specifically, the power consumption in the partial trajectory when the robot arm 120 moves from the first teaching point P1 as the motion start point to the second teaching point P2, the power consumption in the partial trajectory when the robot arm moves from the second teaching point P2 to the third teaching point P3, and the power consumption in the partial trajectory when the robot arm moves from the third teaching point P3 to the first teaching point P1 as the motion end point are summed, and thereby, the accumulated power consumption when the robot arm 120 moves from the teaching point as the motion start point to the teaching point as the motion end point along the trajectory may be calculated.

The power consumption when the robot arm 120 moves along the respective partial trajectories forming the trajectory may be calculated first by calculation of power consumption with respect to each of the six motors (not shown) respectively pivoting the arms 11 to 16 forming the robot arm 120 around the pivot axes J1 to J6 as the pivot centers, and then, by summation of the power consumption of the six motors calculated with respect to each motor.

The power consumption with respect to each of the six motors (not shown) respectively pivoting the arms 11 to 16 around the pivot axes J1 to J6 as the pivot centers may be calculated based on angular velocity waveforms around the pivot axes J1 to J6 when the arms 11 to 16 respectively pivot around the pivot axes J1 to J6 as the pivot centers.

The angular velocity waveforms around the pivot axes J1 to J6 when the arms 11 to 16 respectively pivot around the pivot axes J1 to J6 as the pivot centers may be calculated based on the trajectory data including movement distances and movement directions when the robot arm 120 moves along the trajectory.

Figure 5:
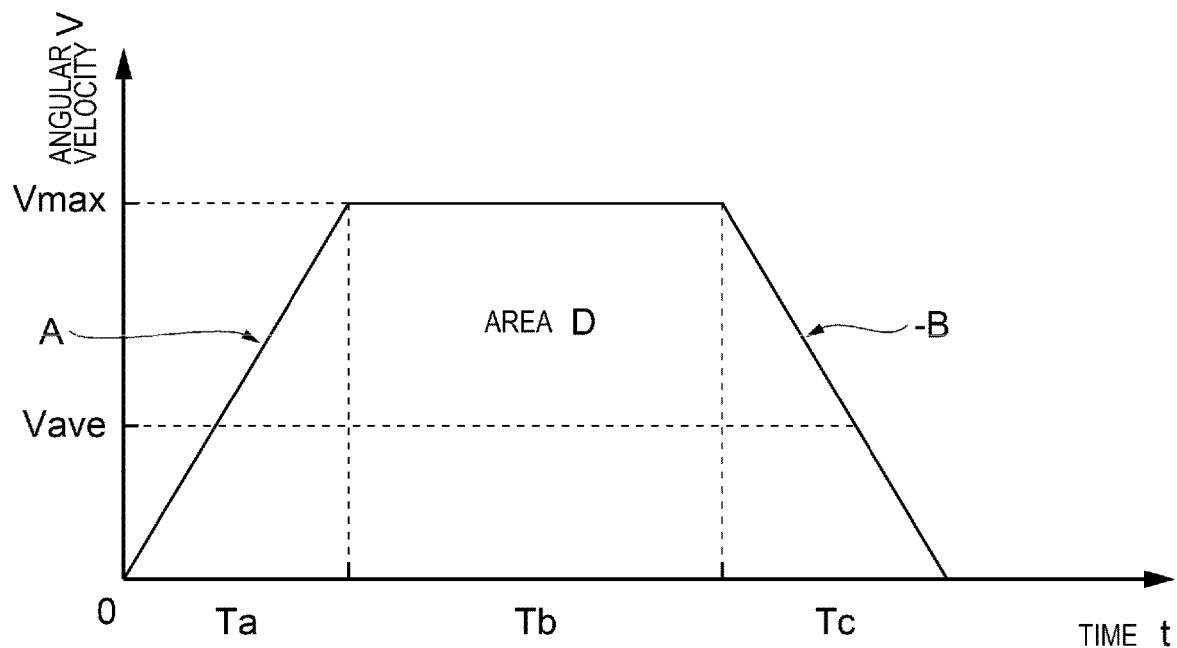
FIG. 5 is an explanatory diagram showing an example of an angular velocity waveform around a first pivot axis of a first arm in a normal mode according to Embodiment 1.

Here, as an example of the angular velocity waveforms around the pivot axes J1 to J6 when the arms 11 to 16 respectively pivot around the pivot axes J1 to J6 as the pivot centers, an angular velocity waveform around the first pivot axis J1 of the first arm 11 when the robot arm 120 moves from the first teaching point P1 to the second teaching point P2 in the normal mode is exemplified in FIG. 5, and a procedure of calculating the power consumption of the motor (not shown) pivoting the first arm 11 around the first pivot axis J1 as the pivot center will be explained with reference to FIG. 5.

As shown in FIG. 5, when the robot arm 120 moves from the first teaching point P1 to the second teaching point P2, the angular velocity waveform around the first pivot axis J1 of the first arm 11 pivoting around the first pivot axis J1 as the pivot center has a trapezoidal shape formed by sequential coupling of an acceleration section in which the first arm 11 pivots at an angular acceleration A for time Ta, a constant velocity section in which the first arm 11 pivots at a predetermined angular velocity Vmax for time Tb, and a deceleration section in which the first arm pivots at an angular deceleration –B for time Tc. Note that the angular deceleration refers to a negative angular acceleration and the absolute value of the angular deceleration –B is B. The angular velocity Vmax in the constant velocity section is the maximum angular velocity when the first arm 11 pivots around the first pivot axis J1 as the pivot center. An area D surrounded by the trapezoidal angular velocity waveform is a rotation angle around the first pivot axis J1 when the first arm 11 pivots around the first pivot axis J1 as the pivot center. An average angular velocity Vave when the first arm 11 pivots around the first pivot axis J1 as the pivot center is an angular velocity that equally divides the area D. The time as the sum of the time Ta, the time Tb, and the time Tc is the movement time of the first arm 11 when the robot arm 120 moves from the first teaching point P1 to the second teaching point P2.

Here, when the robot arm 120 moves from the first teaching point P1 to the second teaching point P2, the power consumption of the motor (not shown) pivoting the first arm 11 around the first pivot axis J1 as the pivot center may be obtained from the following expressions (1), (2), (3), (4), and (5). Note that, hereinafter, the motor (not shown) pivoting the first arm 11 around the first pivot axis J1 as the pivot center is referred to as "first motor" and the reducer (not shown) coupling the first arm 11 and the first motor is referred to as "first reducer".

$$Tq1(t) = I1(t) \times A1(t) \quad (1)$$

$$Tqm1(t) = \eta G \times Tq1(t) \times G \quad (2)$$

$$Pm1(t) = \eta M \times Tqm1(t) \times V1(t) \quad (3)$$

$$\eta G = f(Tq1(t), V1(t)) \quad (4)$$

$$\eta M = f(Tqm1(t), V1(t)) \quad (5)$$

Tq1 is torque output at time t by the drive shaft of the first reducer as the first pivot axis J1 when the robot arm 120 moves from the first teaching point P1 to the second teaching point P2, I1(t) is inertial moment around the first pivot axis J1 at time t, and A1(t) is an angular velocity around the first pivot axis J1 at time t. Tqm1 is torque output at time t by the first motor, and $\eta G$ is transmission efficiency of the first reducer and a function of the torque Tq1(t) output at time t by the drive shaft of the first reducer and the rotation speed V1(t) of the first motor corresponding to the rotation speed of the driven shaft of the first reducer. Pm1(t) is instantaneous power consumption of the first motor at time t. $\eta M$ is efficiency of the first motor and a coefficient for calculation of the power consumption necessary for the first motor to obtain mechanical output of the first motor determined by Tqm1(t)×V1(t). $\eta M$ is a function of the torque Tqm1(t) output by the first motor and the rotation speed V1(t) of the first motor. Note that, in the embodiment, $\eta M$ and $\eta G$ are stored in the memory unit 320 in advance as the robot attribute data RD. The format of the $\eta M$ and $\eta G$ stored in the memory unit 320 is not particularly limited, but may be a function or a lookup table.

Returning to FIG. 3, the method of generating the control program for the robot 100 is explained from step S42. Step S42 is the step of determining whether or not the operation mode is the power-saving mode. When the instruction on the operation mode stored in the memory unit 320 is the power-saving mode, the process goes to step S43. When the instruction on the operation mode is the normal mode, the process goes to step S5.

Step S43 is the step of generating the trajectory of the robot arm 120 in the power-saving mode. Step S43 is executed when the instruction on the power-saving mode is given at step S3. In other words, when the instruction on the power-saving mode is not given, step S43 is not executed, and thereby, the control program for the robot 100 may be efficiently generated.

At step S43, the trajectory in which the robot arm 120 moves between the plurality of teaching points P1 to P3 is generated based on the first constraint condition with respect to the movement time when the robot arm 120 moves between the plurality of teaching points P1 to P3 and the second constraint condition with respect to a drive condition for driving the robot arm 120 to move between the plurality of teaching points P1 to P3. The details of step S43 will be described later.

In the embodiment, the second constraint condition is that absolute values of accelerations and decelerations of the robot arm 120 when the robot arm 120 moves between the plurality of teaching points P1 to P3 along the trajectory in the power-saving mode are smaller than absolute values of accelerations and decelerations of the robot arm 120 when the robot arm 120 moves between the plurality of teaching points P1 to P3 along the trajectory in the normal mode.

Reduction of the absolute values of accelerations and decelerations of the robot arm 120 when the robot arm 120 moves between the plurality of teaching points P1 to P3 is realized by reduction of the absolute values of the angular accelerations and the angular decelerations of the arms 11 to 16 around the pivot axes J1 to J6 when the arms 11 to 16 forming the robot arm 120 respectively pivot around the pivot axes J1 to J6 as the pivot centers.

Figure 6:
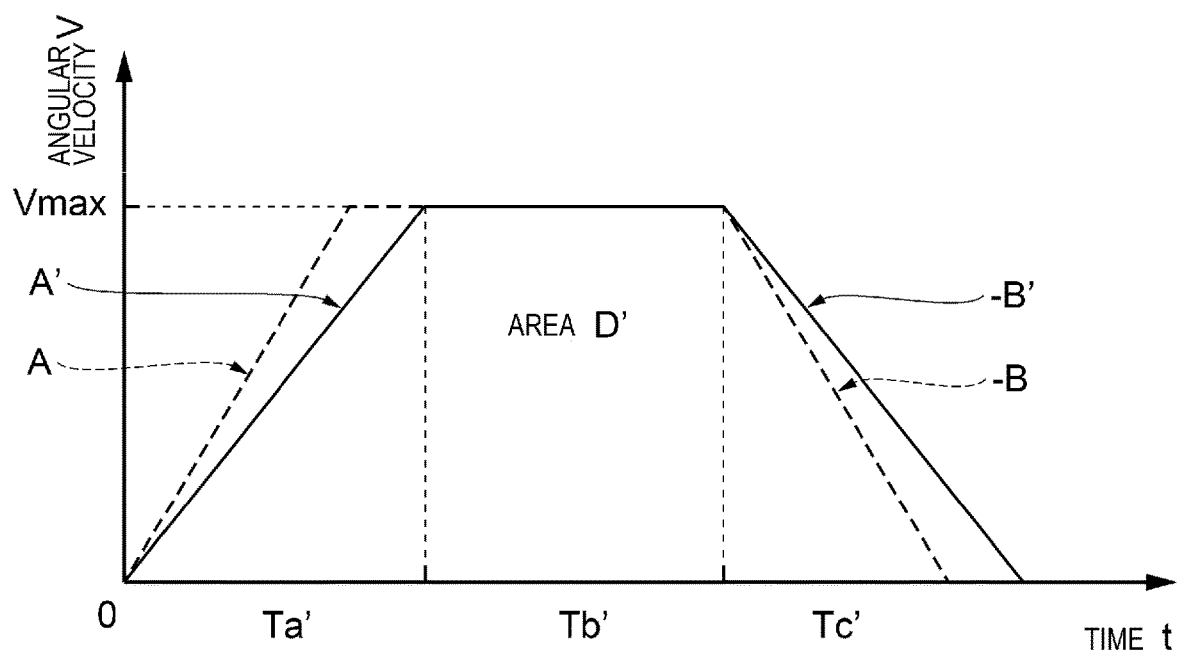
FIG. 6 is an explanatory diagram showing an example of an angular velocity waveform around the first pivot axis of the first arm in a power-saving mode according to Embodiment 1.

Here, as an example of the angular velocity waveforms around the pivot axes J1 to J6 when the arms 11 to 16 respectively pivot around the pivot axes J1 to J6 as the pivot centers in the power-saving mode, an angular velocity waveform around the first pivot axis J1 of the first arm 11 when the robot arm 120 moves from the first teaching point P1 to the second teaching point P2 in the power-saving mode is exemplified in FIG. 6, and the absolute values of the angular acceleration and the angular deceleration of the first arm 11 around the first pivot axis J1 set based on the second constraint condition will be explained with reference to FIG. 6.

As shown in FIG. 6, the angular velocity waveform around the first pivot axis J1 of the first arm 11 in the power-saving mode has a trapezoidal shape formed by sequential coupling of an acceleration section in which the first arm pivots at an angular acceleration A' having a smaller absolute value than the angular acceleration A for time Ta', a constant velocity section in which the first arm 11 pivots at the predetermined angular velocity Vmax for time Tb', and a deceleration section in which the first arm pivots at an angular deceleration −B' having a smaller absolute value than the angular deceleration −B for time Tc'. Note that, in the embodiment, the area D surrounded by the trapezoidal angular velocity waveform in the normal mode is equal to an area D' surrounded by the trapezoidal angular velocity waveform in the power-saving mode. The time as the sum of the time Ta', the time Tb', and the time Tc' is the movement time of the first arm 11 when the robot arm 120 moves from the first teaching point P1 to the second teaching point P2 in the power-saving mode.

In the above described manner, the absolute values of the angular accelerations and the angular decelerations of the angular velocity waveforms of the arms 11 to 16 around the pivot axes J1 to J6 in the power-saving mode may be made smaller than the absolute values of the angular accelerations and the angular decelerations of the angular velocity waveforms of the arms 11 to 16 around the pivot axes J1 to J6 in the normal mode based on the second constraint condition. Further, the partial trajectory of the robot arm 120 when the robot arm 120 moves from the first teaching point P1 to the second teaching point P2 in the power-saving mode may be generated based on the angular velocity waveforms of the arms 11 to 16 around the pivot axes J1 to J6 set based on the second constraint condition.

Similarly, the absolute values of the accelerations and the decelerations of the robot arm 120 when the robot arm 120 moves are made smaller than the absolute values of the accelerations and the decelerations in the normal mode, and thereby, the partial trajectory when the robot arm 120 moves from the second teaching point P2 to the third teaching point P3 in the power-saving mode and the partial trajectory when the robot arm 120 moves from the third teaching point P3 to the first teaching point P1 in the power-saving mode may be generated. Further, the respective partial trajectories of the robot arm 120 in the power-saving mode are coupled from the teaching point as the motion start point and the teaching point as the motion end point, and thereby, the trajectory in which the robot arm 120 moves between the plurality of teaching points P1 to P3 including the motion start point and the motion end point in the power-saving mode may be generated.

In the above described manner, the accumulated power consumption when the robot arm 120 moves along the trajectory of the robot arm 120 in the power-saving mode generated based on the second constraint condition may be calculated based on the angular velocity waveforms of the arms 11 to 16 around the pivot axes J1 to J6 in the same manner as the accumulated power consumption when the robot arm 120 moves along the trajectory of the robot arm 120 in the normal mode. The accumulated power consumption of the robot arm 120 in the power-saving mode is lower than the accumulated power consumption of the robot arm 120 in the normal mode.

The trajectory of the robot arm 120 in the power-saving mode is generated based on the second constraint condition, and thereby, the movement time when the robot arm 120 moves along the trajectory of the robot arm 120 in the power-saving mode is longer than the movement time when the robot arm 120 moves along the trajectory of the robot arm 120 in the normal mode.

In the embodiment, as described above, the maximum value Tmax of the movement time when the robot arm 120 moves between the plurality of teaching points P1 to P3 is set as the first constraint condition. The trajectory of the robot arm 120 in the power-saving mode is generated based on the first constraint condition in addition to the second constraint condition, and thereby, the movement time when the robot arm 120 moves along the trajectory of the robot arm 120 in the power-saving mode may be set to the maximum value Tmax or less. In this manner, the maximum value Tmax is set for the movement time of the robot arm 120 in the power-saving mode, and thereby, the movement time of the robot arm 120 in the power-saving mode may be a proper time or less.

The trajectory data of the trajectory of the robot arm 120 in the power-saving mode generated at step S43 and the accumulated power consumption are stored in the teaching data file PP stored in the memory unit 320. Note that, in addition to the accumulated power consumption of the robot arm 120 in the power-saving mode, the instantaneous maximum power consumption, the average power consumption, the movement time, etc. of the robot arm 120 in the power-saving mode may be stored in the teaching data file pp.

At step S43, when the trajectory of the robot arm 120 in the power-saving mode is generated, step S4 ends and the process goes to step S5. Step S5 is a step of displaying an operation window showing the trajectory of the robot arm 120 is generated at step S4 and the accumulated power consumption of the robot 100 when the robot arm 120 moves along the trajectory.

At step S5, the display unit 340 displays an operation window W20.

Figure 7:
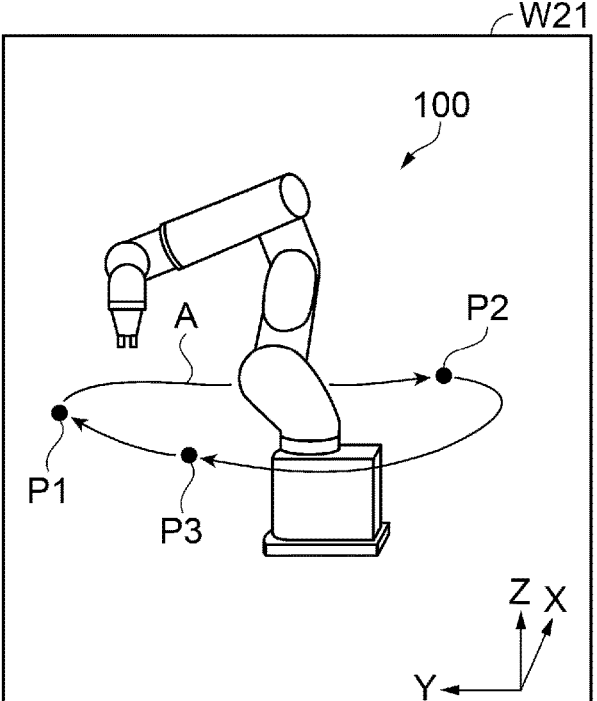
FIG. 7 is an explanatory diagram showing an example of an operation window displaying a trajectory of a robot arm and accumulated power consumption of the robot arm according to Embodiment 1.

As shown in FIG. 7, the operation window W20 contains the robot select field RF for selection of the robot type, a robot display window W21 for display of a simulation image of the robot 100, a power consumption display window W22 for display of the accumulated power consumption etc. of the robot arm 120, a program name entry field NF for an instruction on a program name of the control program for the robot 100, an apply button B3, and a cancel button B4.

Note that the apply button B3 and the cancel button B4 are a receiving section for the teaching processing unit 312 receiving an instruction as to whether or not to employ the trajectory, which will be described later. The teacher may enter the instruction as to whether or not to employ the trajectory using the apply button B3 and the cancel button B4 as the receiving section.

In the robot display window W21, a simulation image containing a three-dimensional image of the robot 100, positions of the teaching points P1 to P3 set by the teacher, and a trajectory A of the robot arm 120 generated at step S4 is displayed. In the power consumption display window W22, instantaneous maximum power consumption, average power consumption, accumulated power consumption, and a movement time when the robot arm 120 moves along the trajectory A generated at step S4 are displayed.

At step S3, when an instruction on the power-saving mode is given as the operation mode of the robot 100, the trajectory A displayed in the robot display window W21 is a trajectory of the robot arm 120 in the power-saving mode. As the instantaneous maximum power consumption, the average power consumption, the accumulated power consumption, and a cycle time displayed in the power consumption display window W22, instantaneous maximum power consumption, average power consumption, accumulated power consumption, and a movement time as a cycle time when the robot arm 120 moves along the trajectory of the robot arm 120 in the power-saving mode are displayed.

Step S6 is a step of generating the control program of the robot 100.

The teacher checks the trajectory A displayed in the robot display window W21 and the power consumption display window W22, and determines whether or not to employ the trajectory A as the trajectory of the robot arm 120 in the power-saving mode.

When employing the trajectory A as the trajectory of the robot arm 120 in the power-saving mode, the teacher enters the program name in the program name entry field NF and presses the apply button B3. The teacher presses the apply button B3, and thereby, an instruction to employ the trajectory A as the trajectory of the robot arm 120 in the power-saving mode is received by the teaching processing unit 312. Then, when the teaching processing unit 312 receives the instruction to employ the trajectory A as the trajectory of the robot arm 120, the teaching processing unit 312 reads out the trajectory data of the trajectory A from the teaching data file PP stored in the memory unit 320 and generates the control program for the robot 100 based on the trajectory A. The generated control program is stored with the program name entered in the program name entry field NF in the control program file RP stored in the memory unit 320. The control program for the robot 100 is generated and stored, and then, the teaching processing program TP ends.

At step S6, when not employing the trajectory A as the trajectory of the robot arm 120 in the power-saving mode, the teacher presses the cancel button B4, and thereby, the teaching processing program TP ends without generation of the control program for the robot 100. Note that, in the embodiment, the teaching processing program TP ends by the teacher pressing the cancel button B4 and, to generate a new trajectory, it is necessary for the teacher to start the teaching processing program TP again. The present disclosure is not limited to that. The teacher presses the cancel button B4, and thereby, the process may return to step S3 without ending the teaching processing program TP and the teacher may generate a new trajectory.

In the above described manner, the apply button B3 and the cancel button B4 are displayed as the receiving section for the teaching processing unit 312 to receive the instruction as to whether or not to employ the trajectory A, and thereby, the teacher may select whether or not to employ the trajectory A as the trajectory of the robot arm 120 in the power-saving mode using the apply button B3 and the cancel button B4. That is, compared to a case where the trajectory A is automatically determined without display of the apply button B3 and the cancel button B4, the teacher may freely select the trajectory. For example, when not employing the trajectory A, the teacher changes various conditions for generation of the trajectory including the number and positions of the teaching points, the first constraint condition, the second constraint condition, the operation mode, etc. and generates a new trajectory, and thereby, may freely select a trajectory more suitable for the trajectory of the robot arm 120.

Further, in the embodiment, when not employing the trajectory A, the teacher presses the cancel button B4 and the control program for the robot 100 is not generated, and thereby, the control program for the robot 100 based on the trajectory not employed by the teacher is not stored in the control program file RP stored in the memory unit 320. Accordingly, the teacher may efficiently manage the control program for the robot 100 stored in the control program file RP.

Note that, when an instruction on the normal mode is given as the operation mode of the robot 100 at step S3, in the operation window W20 displayed by the display unit 340 at step S5, the trajectory of the robot arm 120 in the normal mode, the instantaneous maximum power consumption, the average power consumption, the accumulated power consumption, and the movement time as the cycle time when the robot arm 120 moves along the trajectory in the normal mode are displayed. Then, by the same operation as that when the instruction on the power-saving mode is given, at step S6, the control program for the robot 100 in the normal mode may be generated and stored in the control program file RP.

Next, the details of step S43 as the step of generating the trajectory of the robot arm 120 in the power-saving mode will be explained with reference to FIG. 8.

In the embodiment, a plurality of trajectory candidates in which the robot arm 120 moves between the plurality of teaching points P1 to P3 are generated based on the first constraint condition with respect to the movement time when the robot arm 120 moves between the plurality of teaching points P1 to P3 and the second constraint condition with respect to the drive condition for driving the robot arm 120 to move between the plurality of teaching points P1 to P3. Then, of the plurality of generated trajectory candidates, one trajectory candidate in which the accumulated power consumption when the robot arm 120 moves between the plurality of teaching points P1 to P3 is the minimum is determined as the trajectory, and thereby, the trajectory of the robot arm 120 in the power-saving mode is generated.

Figure 8:
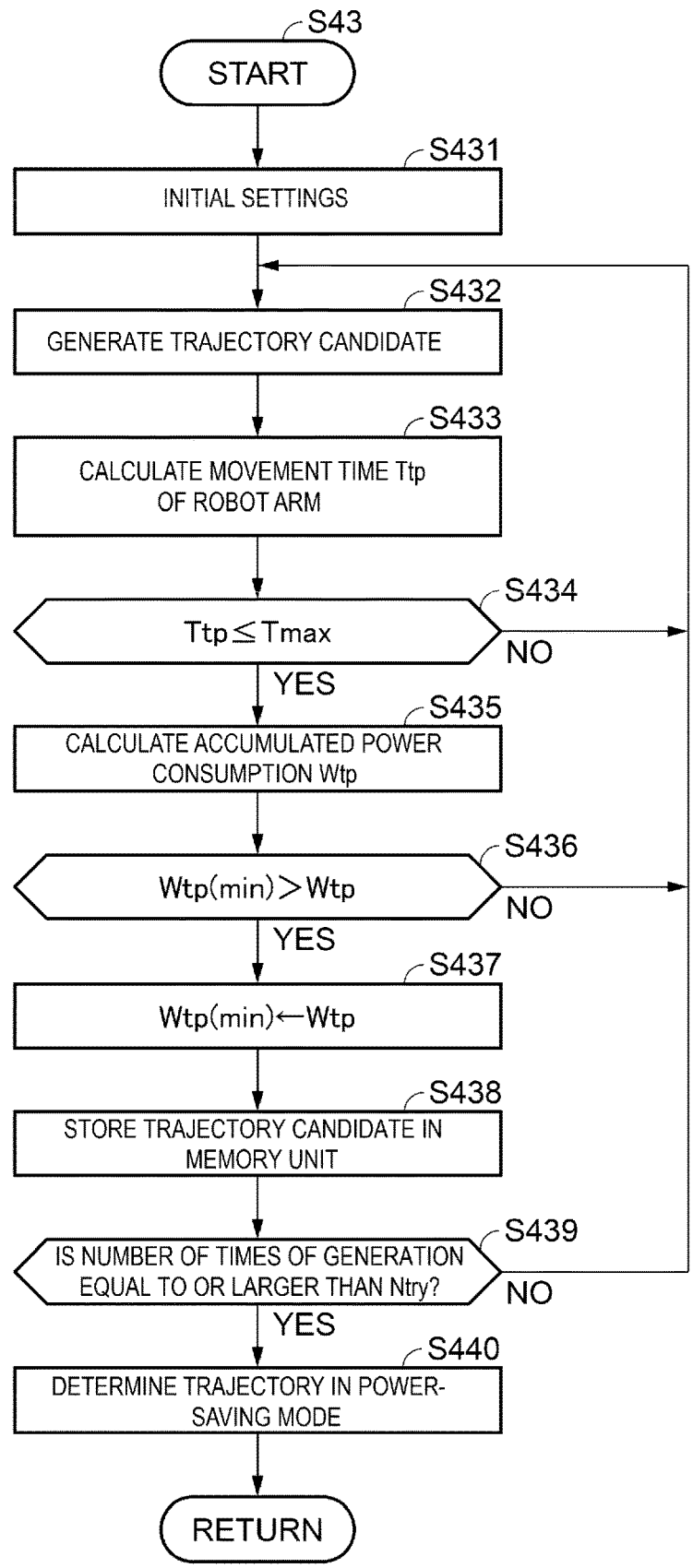
FIG. 8 is a flowchart showing a processing procedure of a process of generating a trajectory of the robot arm in the power-saving mode in FIG. 3.

As shown in FIG. 8, first, step S431 is executed. Step S431 is a step of making initial settings for generation of the trajectory of the robot arm 120 in the power-saving mode. At step S431, the accumulated power consumption when the robot arm 120 moves along the trajectory of the robot arm 120 in the normal mode, the first constraint condition, the second constraint condition, and the number of calculations Ntry are read out from the teaching data file PP stored in the memory unit 320. The number of calculations Ntry refers to an upper limit of the number of times of generation of the trajectory candidates when the plurality of trajectory candidates in which the robot arm 120 moves between the plurality of teaching points P1 to P3 are generated.

Note that, in the embodiment, the second constraint condition and the number of calculations Ntry are stored in the teaching data file PP in advance, however, not necessarily stored in the teaching data file PP in advance. For example, the teacher may give an instruction on the second constraint condition and the number of calculations Ntry using the operation window W10.

Further, at step S431, as a variable for determination of the trajectory candidate having the minimum accumulated power consumption of the plurality of trajectory candidates when the robot arm 120 moves between the plurality of teaching points P1 to P3, the minimum accumulated power consumption Wtp (min) is prepared. The initial value of the minimum accumulated power consumption Wtp (min) is the accumulated power consumption of the robot arm 120 in the normal mode.

At step S432, the trajectory candidate of the robot arm 120 in the power-saving mode is generated based on the second constraint condition.

Specifically, in the respective partial trajectories of the partial trajectory of the robot arm 120 when the robot arm 120 moves from the first teaching point P1 to the second teaching point P2, the partial trajectory of the robot arm 120 when the robot arm 120 moves from the second teaching point P2 to the third teaching point P3, and the partial trajectory of the robot arm 120 when the robot arm 120 moves from the third teaching point P3 to the first teaching point P1, the absolute values of the angular accelerations and the angular decelerations of the arms 11 to 16 around the respective pivot axes J1 to J6 are set to be smaller than the absolute values of the angular accelerations and the angular decelerations in the normal mode, and thereby, the trajectory candidate of the robot arm 120 in the power-saving mode is generated.

The method of generating combinations of the absolute values of the angular accelerations and the angular decelerations of the arms 11 to 16 around the respective pivot axes J1 to J6 to satisfy the second constraint condition is not particularly limited. For example, the combinations of the absolute values of the angular accelerations and the angular decelerations of the arms 11 to 16 around the respective pivot axes J1 to J6 may be randomly generated within a numerical value range that satisfies the second constraint condition. Alternatively, the combinations of the absolute values of the angular accelerations and the angular decelerations of the arms 11 to 16 around the respective pivot axes J1 to J6 may be generated to satisfy the second constraint condition using a combinatorial optimization method such as a meta-heuristics method.

At step S433, a movement time Ttp when the robot arm 120 moves between the plurality of teaching points P1 to P3 along the trajectory candidate of the robot arm 120 generated at step S432.

At step S434, the movement time Ttp when the robot arm 120 moves along the trajectory candidate and the maximum value Tmax of the movement time when the robot arm 120 moves as the first constraint condition in the embodiment are compared. At step S434, when the movement time Ttp when the robot arm 120 moves along the trajectory candidate is more than the maximum value Tmax of the movement time of the robot arm 120, the trajectory candidate of the robot arm 120 created at step S432 does not satisfy the first constraint condition, and the process returns to step S432. On the other hand, at step S434, when the movement time Ttp when the robot arm 120 moves along the trajectory candidate is equal to or less than the maximum value Tmax of the movement time of the robot arm 120, the trajectory candidate of the robot arm 120 created at step S432 satisfies the first constraint condition, and the process goes to step S435.

In the above described manner, in the embodiment, steps S432, S433, S434 are executed, and thereby, the trajectory candidate of the robot arm 120 may be generated based on the first constraint condition and the second constraint condition.

At step S435, accumulated power consumption Wtp when the robot arm 120 moves along the trajectory candidate of the robot arm 120 generated at step S432 is calculated.

At step S436, the minimum accumulated power consumption Wtp (min) and the accumulated power consumption Wtp when the robot arm 120 moves along the trajectory candidate are compared. When the accumulated power consumption Wtp when the robot arm 120 moves along the trajectory candidate is equal to or higher than the minimum accumulated power consumption Wtp (min), the process returns to step S432. On the other hand, when the accumulated power consumption Wtp when the robot arm 120 moves along the trajectory candidate is lower than the minimum accumulated power consumption Wtp (min), the process goes to step S437.

At step S437, the accumulated power consumption Wtp of the trajectory candidate created at step S432 is assigned to the minimum accumulated power consumption Wtp (min), and thereby, the value of the minimum accumulated power consumption Wtp (min) is updated. That is, at step S437, the value held as the minimum accumulated power consumption Wtp (min) is the accumulated power consumption of the trajectory candidate having the minimum accumulated power consumption at the time of the plurality of trajectory candidates of the robot arm 120 generated by repetition of step S432.

At step S438, the trajectory data, the accumulated power consumption Wtp, the movement time Ttp, etc. of the trajectory candidate having the minimum accumulated power consumption at the time of the plurality of trajectory candidates of the robot arm 120 generated by repetition of step S432 are stored in the teaching data file PP stored in the memory unit 320.

At step S439, the number of times of generation of the trajectory candidates by repetition of step S432 and the number of calculations Ntry as the upper limit of the number of times of generation of the trajectory candidates are compared. When the number of times of generation of the trajectory candidates at step S432 is smaller than the number of calculations Ntry, the process returns to step S432 and a new trajectory candidate is generated. On the other hand, when the number of times of generation of the trajectory candidates at step S432 reaches the number of calculations Ntry, the process goes to step S440 without generation of a new trajectory candidate.

At step S440, of the plurality of trajectory candidates generated by repetition of step S432, the trajectory candidate corresponding to the accumulated power consumption held as the minimum accumulated power consumption Wtp (min) is determined as the trajectory candidate in the power-saving mode. As described above, in the embodiment, at step S438, the trajectory data, the accumulated power consumption Wtp, the movement time Ttp, etc. of the trajectory candidate having the minimum accumulated power consumption at the time are stored in the teaching data file PP stored in the memory unit 320, and thereby, the trajectory candidate stored in the teaching data file PP at the time when the number of times of generation of the trajectory candidates reaches the number of calculations Ntry may be determined as the trajectory of the robot arm 120 in the power-saving mode. Further, the accumulated power consumption Wtp, the movement time Ttp, etc. of the trajectory candidate stored in the teaching data file PP may be used as the accumulated power consumption, the movement time, etc. of the robot arm 120 in the power-saving mode, respectively.

As described above, according to the embodiment, the following effects may be obtained.

The method of generating the control program for the robot 100 includes (a) receiving the instruction on the plurality of teaching points P1 to P3 as the reference for the movement of the robot arm 120 of the robot 100 by the processor 310 corresponding to the control unit, (b) generating the trajectory in which the robot arm 120 moves between the plurality of teaching points P1 to P3 based on the first constraint condition with respect to the movement time when the robot arm 120 moves between the plurality of teaching points P1 to P3 and the second constraint condition with respect to the drive condition for driving the robot arm 120 to move the robot arm 120 between the plurality of teaching points P1 to P3 by the processor 310 corresponding to the control unit, (c) displaying the trajectory generated by the processor 310 corresponding to the control unit and the accumulated power consumption when the robot arm 120 moves along the trajectory between the plurality of teaching points P1 to P3 by the display unit 340, and (d) when receiving the instruction to employ the trajectory in which the robot arm 120 moves between the plurality of teaching points P1 to P3 by the processor 310 corresponding to the control unit, generating the control program for the robot 100 based on the trajectory in which the robot arm 120 moves between the plurality of teaching points P1 to P3 by the processor 310 corresponding to the control unit.

According to the method of generating the control program, the control program in the power-saving mode with less power consumption in which the trajectory of the robot arm 120 is optimized in advance to reduce the accumulated power consumption for driving the robot 100 may be provided.

Further, the teaching processing program TP as a computer program for controlling the processor 310 to execute the processing of generating the control program for the robot 100 controls the processor 310 to execute (a) processing of receiving the instruction on the plurality of teaching points P1 to P3 as the reference for the movement of the robot arm 120, (b) processing of generating the trajectory in which the robot arm 120 moves between the plurality of teaching points P1 to P3 based on the first constraint condition with respect to the movement time when the robot arm 120 moves between the plurality of teaching points P1 to P3 and the second constraint condition with respect to the drive condition for driving the robot arm 120 to move the robot arm 120 between the plurality of teaching points P1 to P3, (c) processing of displaying the trajectory generated by the processor 310 and the accumulated power consumption when the robot arm 120 moves along the trajectory between the plurality of teaching points P1 to P3 on the display unit 340, and (d) when receiving the instruction to employ the trajectory generated by the processor 310, processing of generating the control program for the robot 100 based on the trajectory generated by the processor 310.

According to the computer program, the control program in the power-saving mode with less power consumption in which the trajectory of the robot arm 120 is optimized in advance to reduce the accumulated power consumption for driving the robot 100 may be provided.

Furthermore, the teaching apparatus 300 includes the processor 310 and the display unit 340, and the processor 310 executes (a) processing of receiving the instruction on the plurality of teaching points P1 to P3 as the reference for the movement of the robot arm 120, (b) processing of generating the trajectory in which the robot arm 120 moves between the plurality of teaching points P1 to P3 based on the first constraint condition with respect to the movement time when the robot arm 120 moves between the plurality of teaching points P1 to P3 and the second constraint condition with respect to the drive condition for driving the robot arm 120 to move the robot arm 120 between the plurality of teaching points P1 to P3, (c) processing of displaying the trajectory generated by the processor 310 and the accumulated power consumption when the robot arm 120 moves along the trajectory between the plurality of teaching points P1 to P3 on the display unit 340, and (d) when receiving the instruction to employ the trajectory generated by the processor 310, processing of generating the control program for the robot 100 based on the trajectory generated by the processor 310.

According to the teaching apparatus 300, the control program in the power-saving mode with less power consumption in which the trajectory of the robot arm 120 is optimized in advance to reduce the accumulated power consumption for driving the robot 100 may be provided.

In the embodiment, the second constraint condition is that the upper limits of the absolute values of the accelerations and the decelerations of the robot arm 120 when the robot arm 120 moves between the plurality of teaching points P1 to P3 along the trajectory in the power-saving mode are set to the absolute values of the accelerations and the decelerations of the robot arm 120 in the normal mode, and the absolute values of the accelerations and the decelerations of the robot arm 120 in the power-saving mode are made smaller than the absolute values of the accelerations and the decelerations of the robot arm 120 in the normal mode. Note that the second constraint condition is not limited to that, but may include the lowest acceleration and the lowest deceleration as the lower limits of the absolute values of the accelerations and the decelerations of the robot arm 120 in addition to the upper limits of the absolute values of the accelerations and the decelerations of the robot arm 120 in the power-saving mode.

2. Embodiment 2

Next, a method of generating a control program for the robot 100 according to Embodiment 2 will be explained with reference to FIG. 9. Note that the same configurations as those of Embodiment 1 have the same signs and the explanation thereof will be omitted. The method of generating the control program for the robot 100 of Embodiment 2 is the same as that of Embodiment 1 except that the second constraint condition is different from that of the method of generating the control program for the robot 100 of Embodiment 1.

In the embodiment, the second constraint condition is that a highest velocity or an average velocity of the robot arm 120 when the robot arm 120 moves between the plurality of teaching points P1 to P3 along the trajectory in the power-saving mode is lower than a highest velocity or an average velocity of the robot arm 120 when the robot arm 120 moves between the plurality of teaching points P1 to P3 along the trajectory in the normal mode.

Figure 9:
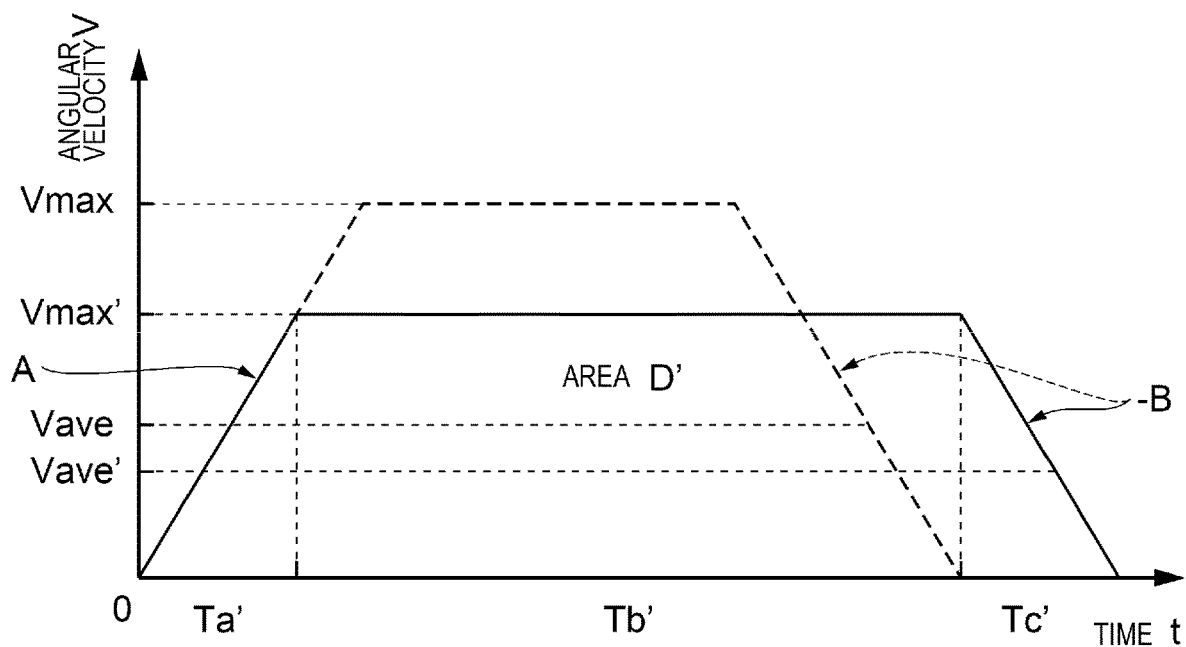
FIG. 9 is an explanatory diagram showing an example of an angular velocity waveform around the first pivot axis of the first arm in a power-saving mode according to Embodiment 2.

As shown in FIG. 9, for example, in the power-saving mode, when the robot arm 120 moves from the first teaching point P1 to the second teaching point P2, in an angular velocity waveform in which the first arm 11 pivots around the first pivot axis J1 as the pivot center, a highest angular velocity when the first arm 11 pivots around the first pivot axis J1 as the pivot center is an angular velocity Vmax' in the constant velocity section. The angular velocity Vmax' is set to be lower than the angular velocity Vmax of an angular velocity waveform of the first arm 11 around the first pivot axis J1 in the normal mode based on the second constraint condition.

Similarly, in the respective partial trajectories of the partial trajectory of the robot arm 120 in which the robot arm 120 moves from the first teaching point P1 to the second teaching point P2, the partial trajectory of the robot arm 120 in which the robot arm 120 moves from the second teaching point P2 to the third teaching point P3, and the partial trajectory of the robot arm 120 in which the robot arm 120 moves from the third teaching point P3 to the first teaching point P1, the angular velocities Vmax' of the arms 11 to 16 around the respective pivot axes J1 to J6 in the power-saving mode are set to be lower than the angular velocities Vmax of the arms 11 to 16 around the respective pivot axes J1 to J6 in the normal mode, and thereby, the highest velocity of the robot arm 120 in the power-saving mode may be made lower than the highest velocity of the robot arm 120 in the normal mode.

Similarly, the average angular velocities Vave' of the arms 11 to 16 around the respective pivot axes J1 to J6 in the power-saving mode are set to be lower than the average angular velocities Vave of the arms 11 to 16 around the respective pivot axes J1 to J6 in the normal mode, and thereby, the average velocity of the robot arm 120 in the power-saving mode may be made lower than the average velocity of the robot arm 120 in the normal mode.

In the above described manner, the trajectory of the robot arm 120 in the power-saving mode is generated based on the second constraint condition in the embodiment, and thereby, the accumulated power consumption when the robot arm 120 moves along the trajectory of the robot arm 120 in the power-saving mode may be made lower than the accumulated power consumption when the robot arm 120 moves along the trajectory of the robot arm 120 in the normal mode.

According to the embodiment, as is the case of Embodiment 1, the control program for the robot 100 in the power-saving mode in which the trajectory of the robot arm 120 is optimized in advance to reduce the accumulated power consumption for driving the robot 100 may be generated.

3. Embodiment 3

Next, a method of generating the control program for the robot 100 according to Embodiment 3 will be explained. Note that the same configurations as those of Embodiment 1 have the same signs and the explanation thereof will be omitted. The method of generating the control program for the robot 100 of Embodiment 3 is the same as that of Embodiment 1 except that the second constraint condition is different from that of the method of generating the control program for the robot 100 of Embodiment 1.

In the embodiment, the second constraint condition is that a fluctuation range of the position of the robot arm 120 in the direction of gravitational force when the robot arm 120 moves between the plurality of teaching points P1 to P3 along the trajectory in the power-saving mode is narrower than a fluctuation range of the position of the robot arm 120 in the direction of gravitational force when the robot arm 120 moves between the plurality of teaching points along the trajectory in the normal mode.

The fluctuation range of the position of the robot arm 120 in the direction of gravitational force refers to distances between positions at the most plus side in the Z-axis direction and positions at the most minus side in the Z-axis direction on the respective partial trajectories in the respective partial trajectories of the partial trajectory of the robot arm 120 in which the robot arm 120 moves from the first teaching point P1 to the second teaching point P2, the partial trajectory of the robot arm 120 in which the robot arm 120 moves from the second teaching point P2 to the third teaching point P3, and the partial trajectory of the robot arm 120 in which the robot arm 120 moves from the third teaching point P3 to the first teaching point P1.

For example, the partial trajectory in which the robot arm 120 moves from the first teaching point P1 to the second teaching point P2 is not a straight line connecting the first teaching point P1 and the second teaching point P2, the partial trajectory of the robot arm 120 fluctuates toward the plus sides or the minus sizes of the X-axis direction, the Y-axis direction, and the Z-axis direction with respect to the straight line connecting the first teaching point P1 and the second teaching point P2. The Z-axis direction is the direction of gravitational force, and the fluctuation of the partial trajectory of the robot arm 120 in the Z-axis direction influences the accumulated power consumption of the robot arm 120. When the fluctuation of the partial trajectory of the robot arm 120 in the Z-axis direction is larger, the accumulated power consumption of the robot arm 120 is higher. Accordingly, the fluctuation range of the partial trajectory of the robot arm 120 in the Z-axis direction in the normal mode is set to be narrower than the fluctuation range of the partial trajectory of the robot arm 120 in the Z-axis direction in the power-saving mode, and thereby, the accumulated power consumption when the robot arm 120 moves along the partial trajectory for movement from the first teaching point P1 to the second teaching point P2 may be made lower.

According to the embodiment, as is the case of Embodiment 1, the control program for the robot 100 in the power-saving mode in which the trajectory of the robot arm 120 is optimized in advance to reduce the accumulated power consumption for driving the robot 100 may be generated.

As described above, the second constraint condition of Embodiment 1 uses the absolute values of accelerations and decelerations of the robot arm 120, the second constraint condition of Embodiment 2 uses the highest velocity or the average velocity of the robot arm 120, and the constraint condition of Embodiment 3 uses the fluctuation range of the position of the robot arm 120 in the direction of gravitational force. The second constraint conditions are respectively different among Embodiment 1, Embodiment 2, and Embodiment 3, however, as the second constraint condition, a combination of the respective second constraint conditions in Embodiments 1 to 3 may be used.

4. Embodiment 4

Next, a method of generating the control program for the robot 100 according to Embodiment 4 will be explained with reference to FIG. 10. Note that the same configurations as those of Embodiment 1 have the same signs and the explanation thereof will be omitted. The method of generating the control program for the robot 100 of Embodiment 4 is the same as that of Embodiment 1 except that an operation window W20a displayed by the display unit 340 is different from that of the method of generating the control program for the robot 100 of Embodiment 1.

The operation window W20a displayed by the display unit 340 is an operation window for display of the trajectory of the robot arm 120 and the accumulated power consumption of the robot 100 when the robot arm 120 moves along the trajectory.

Figure 10:
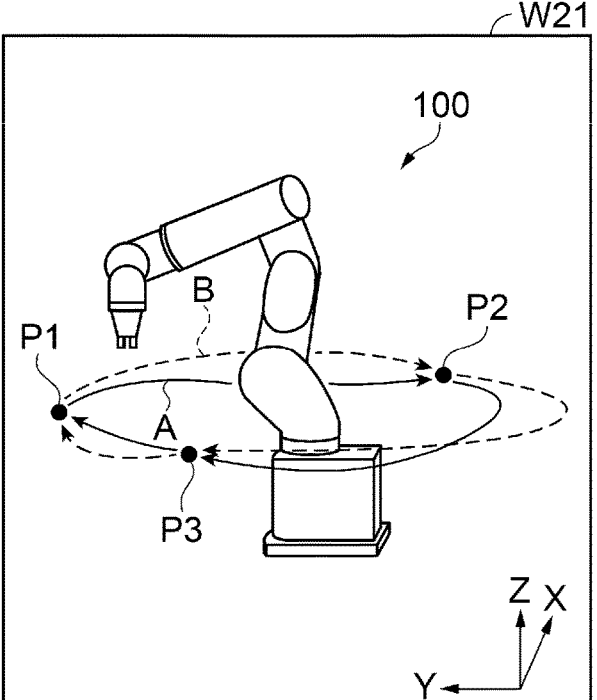
FIG. 10 is an explanatory diagram showing an example of an operation window displaying a trajectory of the robot arm and accumulated power consumption of the robot arm according to Embodiment 4.

As shown in FIG. 10, the operation window W20a contains the robot select field RF for selection of the robot type, the robot display window W21 for display of a simulation image of the robot 100, power consumption display windows W22, W23 for display of the accumulated power consumption etc. of the robot arm 120, a trajectory select field TF for selection of a trajectory for which the control program for the robot 100 is generated, the program name entry field NF for the instruction on the program name of the control program for the robot 100, the apply button B3, and the cancel button B4.

In the robot display window W21, a simulation image containing the three-dimensional image of the robot 100, the positions of the teaching points P1 to P3 set by the teacher, and a trajectory A of the robot arm 120 in the power-saving mode and a trajectory B of the robot arm 120 in the normal mode is displayed. In the power consumption display window W22, instantaneous maximum power consumption, average power consumption, accumulated power consumption, and a movement time when the robot arm 120 moves along the trajectory A are displayed. In the power consumption display window W23, instantaneous maximum power consumption, average power consumption, accumulated power consumption, and a movement time when the robot arm 120 moves along the trajectory B are displayed.

The teacher checks the trajectory A in the power-saving mode and the trajectory B in the normal mode displayed in the robot display window W21 and the power consumption display windows W22, W23, and determines whether to employ the trajectory A or the trajectory B as the trajectory of the robot arm 120. The trajectory select field TF is a field for selection of arbitrary one of the trajectory A and the trajectory B. In the embodiment, the trajectory select field TF is formed as a pull-down menu. When selecting the trajectory A in the power-saving mode as the trajectory for which the control program for the robot 100 is generated, the teacher selects the trajectory A in the trajectory select field TF.

The teacher enters the program name in the program name entry field NF and presses the apply button B3, and thereby, an instruction to employ the trajectory A as the trajectory of the robot arm 120 in the power-saving mode is received by the teaching processing unit 312. Then, when the teaching processing unit 312 receives the instruction to employ the trajectory A as the trajectory of the robot arm 120, the teaching processing unit 312 reads out the trajectory data of the trajectory A selected in the trajectory select field TF from the teaching data file PP stored in the memory unit 320 and generates the control program for the robot 100 based on the trajectory A. The generated control program is stored with the program name entered in the program name entry field NF in the control program file RP stored in the memory unit 320. The control program for the robot 100 is generated and stored, and then, the teaching processing program TP ends.

According to the embodiment, the following effects may be obtained in addition to the effects in Embodiment 1.

The display unit 340 displays the trajectory B of the robot arm 120 in the normal mode, the accumulated power consumption when the robot arm 120 moves between the plurality of teaching points P1 to P3 along the trajectory B, the trajectory A of the robot arm 120 in the power-saving mode, and the accumulated power consumption when the robot arm 120 moves between the plurality of teaching points P1 to P3 along the trajectory A, and thereby, the teacher may easily compare the trajectory A of the robot arm 120 in the power-saving mode and the trajectory B of the robot arm 120 in the normal mode. Accordingly, the teacher may efficiently proceed with the generation of the control program for the robot 100.

Note that, in the above described embodiments, PTP control is used for generation of the trajectory of the robot 100, however, CP control (Continuous Path control) may be used.

Further, in the above described embodiments, the single-arm six-axis vertical articulated robot is exemplified as the robot 100, however, the method of generating the control program for the robot 100 in the present disclosure may be applied to a robot including any robot arm mechanism having one or more joints.

As described above, the method of generating the control program for the robot 100 in the present disclosure may generate the control program optimized in advance to reduce the accumulated power consumption for driving the robot 100. When the method is applied to a robot driven by a battery, the drive time by the battery may be effectively extended.

What is claimed is:

1. A control system for controlling a robot, comprising:
a teaching apparatus generating a control program for the robot, comprising:
a processor; and
a display unit,
wherein the processor is configured to
receive an instruction on a plurality of teaching points as a reference for movement of a robot arm of the robot;
generate a trajectory in which the robot arm moves between the plurality of teaching points, based on a first constraint condition with respect to a movement time for which the robot arm moves between the plurality of teaching points and a second constraint condition with respect to a drive condition when the robot arm moves between the plurality of teaching points;
control to display the trajectory and accumulated power consumption when the robot arm moves between the plurality of teaching points along the trajectory on the display unit; and
generate the control program for the robot based on the trajectory when receiving an instruction to employ the trajectory,
wherein the second constraint condition is that absolute values of an acceleration and a deceleration of the robot arm when the robot arm moves between the plurality of teaching points along the trajectory in the power-saving mode are smaller than absolute values of an acceleration and a deceleration of the robot arm when the robot arm moves between the plurality of teaching points along the trajectory in the normal mode; and
a control apparatus electrically coupled to the teaching apparatus, wherein the control apparatus is configured to control a position and an attitude of the robot arm according to the control program, to cause the robot arm to move along the generated trajectory.

2. The control system according to claim 1, wherein the processor is further configured to generates a plurality of trajectory candidates as candidates for the trajectory, and determines one trajectory candidate having the minimum accumulated power consumption of the plurality of trajectory candidates as the trajectory.

3. The control system according to claim 1, the processor is further configured to receive an instruction to select one of a normal mode and the power-saving mode in which the accumulated power consumption when the robot arm moves between the plurality of teaching points is lower than that in the normal mode, wherein
the trajectory is generated when the instruction to select the power-saving mode is given.

4. The control system according to claim 3, wherein the display unit is configured to displays the trajectory and the accumulated power consumption in the normal mode, and the trajectory and the accumulated power consumption in the power-saving mode.

5. The control system according to claim 1, wherein the display unit is configured to displays a receiving section for the processor to receive an instruction as to whether or not to employ the trajectory.

6. A control system for controlling a robot, comprising:
a teaching apparatus generating a control program for the robot, comprising:
a processor; and
a display unit, wherein the processor is configured to
receive an instruction on a plurality of teaching points as a reference for movement of a robot arm of the robot;
generate a trajectory in which the robot arm moves between the plurality of teaching points, based on
a first constraint condition with respect to a movement time for which the robot arm moves between the plurality of teaching points and
a second constraint condition with respect to a drive condition when the robot arm moves between the plurality of teaching points;
control to display the trajectory and accumulated power consumption when the robot arm moves between the plurality of teaching points along the trajectory on the display unit; and
generate the control program for the robot based on the trajectory when receiving an instruction to employ the trajectory,
wherein the second constraint condition is that a fluctuation range of a position of the robot arm in a direction of gravitational force when the robot arm moves between the plurality of teaching points along the trajectory in the power-saving mode is narrower than a fluctuation range of the position of the robot arm in the direction of gravitational force when the robot arm moves between the plurality of teaching points along the trajectory in the normal mode; and
a control apparatus electrically coupled to the teaching apparatus, wherein the control apparatus is configured to control a position and an attitude of the robot arm according to the control program, to cause the robot arm to move along the generated trajectory.

7. A robot system, comprising:
a robot includes a robot arm;
a teaching apparatus generating a control program for the robot, comprising:
a processor; and
a display unit,
wherein the processor is configured to
receive an instruction on a plurality of teaching points as a reference for movement of the robot arm of the robot;
generate a trajectory in which the robot arm moves between the plurality of teaching points, based on
a first constraint condition with respect to a movement time for which the robot arm moves between the plurality of teaching points and
a second constraint condition with respect to a drive condition when the robot arm moves between the plurality of teaching points;
control to display the trajectory and accumulated power consumption when the robot arm moves between the plurality of teaching points along the trajectory on the display unit; and
generate the control program for the robot based on the trajectory when receiving an instruction to employ the trajectory,
wherein the second constraint condition is that absolute values of an acceleration and a deceleration of the robot arm when the robot arm moves between the plurality of teaching points along the trajectory in the power-saving mode are smaller than absolute values of an acceleration and a deceleration of the robot arm when the robot arm moves between the plurality of teaching points along the trajectory in the normal mode; and
a control apparatus electrically coupled to the teaching apparatus, wherein the control apparatus is configured to control a position and an attitude of the robot arm according to the control program, to cause the robot arm to move along the generated trajectory.

* * * * *